(12) United States Patent
Kim et al.

(10) Patent No.: US 9,614,260 B2
(45) Date of Patent: Apr. 4, 2017

(54) BATTERY PACK OF EXCELLENT COOLING EFFICIENCY

(71) Applicant: LG CHEM, LTD., Seoul (KR)

(72) Inventors: MinJung Kim, Suwon-si (KR); Chae Ho Chung, Daejeon (KR); SangYoon Jeong, Daejeon (KR); JunSeok Choi, Daejeon (KR); Jong Moon Yoon, Daejeon (KR); DalMo Kang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 13/854,672

(22) Filed: Apr. 1, 2013

(65) Prior Publication Data

US 2013/0216875 A1 Aug. 22, 2013

Related U.S. Application Data

(63) Continuation of application No. PCT/KR2011/007810, filed on Oct. 20, 2011.

(30) Foreign Application Priority Data

Oct. 20, 2010 (KR) .................. 10-2010-0102229

(51) Int. Cl.
*H01M 10/50* (2006.01)
*H01M 10/625* (2014.01)
(Continued)

(52) U.S. Cl.
CPC ..... *H01M 10/5016* (2013.01); *B60L 11/1874* (2013.01); *B60L 11/1879* (2013.01);
(Continued)

(58) Field of Classification Search
None
See application file for complete search history.

(56) References Cited

U.S. PATENT DOCUMENTS

2005/0191549 A1 9/2005 Kang et al.
2006/0093901 A1* 5/2006 Lee et al. .............. 429/120
(Continued)

FOREIGN PATENT DOCUMENTS

CN 100367538 C 2/2008
EP 1 777 770 A1 4/2007
(Continued)

OTHER PUBLICATIONS

International Search Report Issued in PCT/KR2011/007810, mailed on Jun. 1, 2012.

*Primary Examiner* — Barbara Gilliam
*Assistant Examiner* — Adam A Arciero
(74) *Attorney, Agent, or Firm* — Birch, Stewart, Kolasch & Birch, LLP

(57) ABSTRACT

Discussed herein is a battery pack configured to have a structure in which a battery pack case is provided at the upper part and the lower part thereof with a coolant inlet port and a coolant outlet port, respectively, the battery pack case is provided with a coolant introduction part and a coolant discharge part, the coolant introduction part includes (a) a parallel introduction part adjacent to the coolant inlet port, the parallel introduction part extending in parallel to a top of the unit cell stack and (b) an inclined introduction part connected to the parallel introduction part, the inclined introduction part extending from the coolant inlet port to an end of the battery pack case opposite to the coolant inlet port such that a distance between the inclined introduction part and the top of the unit cell stack is gradually decreased.

16 Claims, 2 Drawing Sheets

(51) Int. Cl.
- *B60L 11/18* (2006.01)
- *H01M 10/6563* (2014.01)
- *H01M 10/6566* (2014.01)
- *H01M 10/613* (2014.01)

(52) U.S. Cl.
CPC ....... *H01M 10/613* (2015.04); *H01M 10/625* (2015.04); *H01M 10/6563* (2015.04); *H01M 10/6566* (2015.04); *B60L 2240/545* (2013.01); *H01M 2220/20* (2013.01); *Y02T 10/705* (2013.01); *Y02T 10/7005* (2013.01)

(56) References Cited

U.S. PATENT DOCUMENTS

| | | |
|---|---|---|
| 2006/0202661 A1 | 9/2006 | Kim et al. |
| 2006/0240318 A1 | 10/2006 | Kim et al. |
| 2007/0026301 A1 | 2/2007 | Lee et al. |
| 2007/0285051 A1 | 12/2007 | Jeon et al. |
| 2009/0311586 A1* | 12/2009 | Chung et al. ................ 429/120 |
| 2011/0052739 A1 | 3/2011 | Rival et al. |
| 2011/0177367 A1* | 7/2011 | Chung et al. .................. 429/83 |
| 2012/0088131 A1 | 4/2012 | Chung et al. |

FOREIGN PATENT DOCUMENTS

| | | |
|---|---|---|
| JP | 2008-12847 A | 1/2006 |
| JP | 2006-253144 A | 9/2006 |
| JP | 2008-192381 A | 8/2008 |
| JP | 4554621 B2 | 9/2010 |
| JP | 4659699 B2 | 3/2011 |
| JP | 2011-519353 A | 7/2011 |
| JP | 4726691 B2 | 7/2011 |
| JP | 5384535 B2 | 1/2014 |
| KR | 10-2006-0037600 A | 5/2006 |
| KR | 10-2006-0037630 A | 5/2006 |
| KR | 10-0648705 B1 | 11/2006 |
| KR | 10-2010-0012018 A | 2/2010 |
| WO | 2005/074054 A1 | 8/2005 |
| WO | WO 2010013902 A2 * | 2/2010 |
| WO | 2010/098598 A | 9/2010 |

* cited by examiner

BATTERY PACK OF EXCELLENT COOLING EFFICIENCY

CROSS-REFERENCE TO RELATED APPLICATIONS

This application is a continuation of PCT International Application No. PCT/KR2011/007810 filed on Oct. 20, 2011, which claims priority under 35 U.S.C. 119(a) to Application No. 10-2010-0102229 filed Oct. 20, 2010 in the Republic of Korea, all of which are hereby expressly incorporated by reference into the present application.

TECHNICAL FIELD

The present invention relates to a battery pack exhibiting high cooling efficiency, and, more particularly, to a battery pack configured to have a structure in which a battery pack case is provided at the upper part and the lower part thereof with a coolant inlet port and a coolant outlet port, respectively, the battery pack case is provided with a coolant introduction part and a coolant discharge part, the coolant introduction part includes a parallel introduction part and an inclined introduction part, and an inclined inflection point at which the parallel introduction part and the inclined introduction part are connected to each other is located at a specific region.

BACKGROUND ART

Recently, a secondary battery, which can be charged and discharged, has been widely used as an energy source for wireless mobile devices. Also, the secondary battery has attracted considerable attention as a power source for electric vehicles (EV), hybrid electric vehicles (HEV), and plug-in hybrid electric vehicles (Plug-in HEV), which have been developed to solve problems, such as air pollution, caused by existing gasoline and diesel vehicles using fossil fuels.

Small-sized mobile devices use one or several battery cells for each device. On the other hand, middle or large-sized devices, such as vehicles, use a battery pack having a plurality of battery cells electrically connected to each other because high power and large capacity are necessary for the middle or large-sized devices.

Preferably, a battery pack is manufactured so as to have as small a size and weight as possible. For this reason, a prismatic battery or a pouch-shaped battery, which can be stacked with high integration and has a small weight to capacity ratio, is usually used as a battery cell of the battery pack. In particular, much interest is currently focused on such a pouch-shaped battery, which uses an aluminum laminate sheet as a sheathing member, because the pouch-shaped battery is lightweight, the manufacturing cost of the pouch-shaped battery is low, and it is easy to modify the shape of the pouch-shaped battery.

In order for a middle or large-sized battery module to provide power and capacity required by a specific apparatus or device, it is necessary for the middle or large-sized battery module to be configured to have a structure in which a plurality of battery cells is electrically connected in series to each other, and the battery cells are stable against external force.

Also, the battery cells constituting the middle or large-sized battery module are secondary batteries which can be charged and discharged. Consequently, a large amount of heat is generated from the high power, large capacity secondary batteries during the charge and discharge of the batteries. If the heat, generated from the unit cells during the charge and discharge of the unit cells, is not effectively removed, the heat accumulates in the respective unit cells with the result that the deterioration of the unit cells is accelerated. According to circumstances, the unit cells may catch fire or explode. For this reason, a cooling system is needed in a battery pack for vehicles, which is a high power, large capacity battery, to cool battery cells mounted in the battery pack.

In a middle or large-sized battery pack including a plurality of battery cells, on the other hand, the deterioration in performance of some battery cells leads to the deterioration in performance of the entire battery pack. One of the main factors causing the non-uniformity in performance is the non-uniformity of cooling between the battery cells. For this reason, it is necessary to provide a structure to optimize the shape of a flow channel, thereby minimizing temperature deviation during the flow of a coolant.

Some conventional middle or large-sized battery packs use a battery pack case configured to have a structure in which a coolant inlet port and a coolant outlet port are located at the upper part and the lower part of the battery pack case, respectively, such that the coolant inlet port and the coolant outlet port are directed in opposite directions, and the top and bottom of a flow space extending from the coolant inlet port to a battery module are parallel to each other. In this structure, however, coolant flux in a flow channel adjacent to the coolant outlet port is greatly reduced with the result that temperature deviation between battery cells is high.

In connection with this case, there is disclosed a middle or large-sized battery pack configured to have a structure in which an air guide plane is inclined downward to a side of the battery pack case opposite to battery cells such that the air guide plane becomes closer to the battery cells with the increase in distance between the air guide plane and a coolant inlet port. Specifically, the air guide plane is inclined at a predetermined angle, for example an angle of 15 to 45 degrees, to the side of the battery pack case opposite to the battery cells, and the coolant inlet port is formed in the horizontal direction, thereby restraining the occurrence of a phenomenon in which a coolant is excessively introduced into a flow channel adjacent to a coolant outlet port.

However, the inventors of the present application have found that it is not possible to achieve optimum cooling uniformity through the above structure, and, in particular, temperature deviation between the battery cells is changed depending upon the structure of a coolant introduction part adjacent to the coolant inlet port.

DISCLOSURE

Technical Problem

Therefore, the present invention has been made to solve the above problems and other technical problems that have yet to be resolved.

As a result of a variety of extensive and intensive studies and experiments on a battery pack, the inventors of the present application have found that, when an inflection point at which a horizontal section and an inclined section are connected to each other is located at a specific region of the battery pack, cooling uniformity of the battery pack is high. The present invention has been completed based on these findings.

Technical Solution

In accordance with one aspect of the present invention, the above and other objects can be accomplished by the provision of a battery pack in which a plurality of battery cells or unit modules, each of which has two or more battery cells mounted therein, is mounted in a battery pack case such that the battery cells or the unit modules are stacked in an upright or upside-down fashion, wherein the battery pack case is provided at the upper part and the lower part thereof with a coolant inlet port and a coolant outlet port, respectively, which are directed in opposite directions such that a coolant to cool the battery cells or the unit modules, i.e. unit cells, flows from one side to the other side of the battery module in a direction perpendicular to the stacked direction of the unit cells, the battery pack case is further provided with a flow space ('coolant introduction part') extending from the coolant inlet port to the battery module and another flow space ('coolant discharge part') extending from the battery module to the coolant outlet port, the coolant introduction part includes (a) a parallel introduction part adjacent to the coolant inlet port, the parallel introduction part extending in parallel to a top of the unit cell stack, and (b) an inclined introduction part connected to the parallel introduction part, the inclined introduction part extending from the coolant inlet port to an end of the battery pack case opposite to the coolant inlet port such that a distance between the inclined introduction part and the top of the unit cell stack is gradually decreased, and an inclined inflection point at which the parallel introduction part and the inclined introduction part are connected to each other is located at a coolant flow channel ('first coolant flow channel') between a first unit cell ('first cell') from the coolant inlet port and the battery pack case facing the first cell.

Hereinafter, the battery cells or the unit cells will be referred to as 'unit cells'.

In the battery pack, a region at which a duct is connected to the coolant inlet port is generally needed. A coolant, which is a fluid, is introduced into the parallel introduction part and then the inclined introduction part through the coolant inlet port. At this time, the upper stream of the coolant collides with the inclined introduction part at the inclined inflection point at which the parallel introduction part and the inclined introduction part are connected to each other with the result the coolant flows downward to the battery module. On the other hand, the lower stream of the coolant flows while the flow direction of the coolant is not changed. As a result, an eddy is generated in the coolant. Such an eddy disturbs optimum flow of the coolant. For this reason, it is difficult to achieve desired cooling uniformity among the battery cells by simply providing the inclined introduction part.

In connection with this case, the inventors of the present application have found that, when the inflection point is located at the coolant flow channel ('first coolant flow channel') between the first unit cell ('first cell') from the coolant inlet port and the battery pack case facing the first cell, a coolant flux introduced into the first coolant flow channel due to the generation of such an eddy is increased with the result that cooling uniformity among the battery cells is improved, thereby reducing temperature deviation among the battery cells and thus improving cooling efficiency among the battery cells. That is, a phenomenon that the battery cells adjacent to the side of the battery pack case opposite to the coolant inlet port are much more cooled than the battery cells adjacent to the coolant inlet port is greatly reduced.

In the present invention, the 'first coolant flow channel' is interpreted as including the first coolant flow channel and the periphery thereof. Consequently, the inclined inflection point may be located on the first coolant flow channel or the periphery of the first coolant flow channel. However, the periphery of the first coolant flow channel does not include a second coolant flow channel. This is because, when the inclined inflection point is located on the second coolant flow channel, temperature deviation among the battery cell or the unit modules is increased as can be seen from the comparison results of FIGS. 2 and 4, which will hereinafter be described, In a preferred example, the inclined inflection point may be located within a deviation range corresponding to a width $W_b$ of the first cell on the basis of a central axis of the first coolant flow channel.

If the inclined inflection point is located out of the deviation range corresponding to the width $W_b$ of the first cell on the basis of the central axis of the first coolant flow channel toward the coolant inlet port, additional design or modification to connect the duct to the coolant inlet port may be necessary, and a parallel section of a predetermined length for duct connection may be necessary. In this case, a protrusion may be formed at the battery pack with the result that space efficiency is lowered.

On the other hand, if the inclined inflection point is located out of the deviation range corresponding to the width $W_b$ of the first cell on the basis of the central axis of the first coolant flow channel toward the end of the battery pack case opposite to the coolant inlet port, cooling efficiency of the battery cells adjacent to the coolant inlet port is lowered as previously described.

The first coolant flow channel may have a width $W_c$ equivalent to 10 to 100% the width $W_b$ of the first cell.

If the width $W_c$ of the first coolant flow channel is less than 10% the width $W_b$ of the first cell, a coolant flux does not sufficiently pass through the battery cells with the result that desired cooling efficiency is not achieved. On the other hand, if the width $W_c$ of the first coolant flow channel is greater than 100% the width $W_b$ of the first cell, the volume of the battery pack is much more increased than the cooling efficiency, which is not preferable. For this reason, the first coolant flow channel may have a width $W_c$ equivalent to 20 to 70% the width $W_b$ of the first cell.

The inclined inflection point may be located on the central axis of the first coolant flow channel.

If the inclined inflection point is located on the central axis of the first coolant flow channel, an eddy is generated in the coolant on the central axis of the first coolant flow channel with the result that a coolant flux introduced into the first coolant flow channel is increased, thereby further reducing temperature deviation among the battery cells.

In a preferred example, the inclined introduction part may have an inclination angle of 3 to 8 degrees.

If the inclined introduction part has an inclination angle of less than 3 degrees, it is not possible to efficiently reduce temperature deviation among the battery cells. On the other hand, if the inclined introduction part has an inclination angle of greater than 8 degrees, the width of the coolant inlet port is increased with the result that it is not possible to manufacture a compact battery pack. In addition, as the sectional area of the coolant inlet port is increased, the velocity of the coolant may be decreased, which is not preferable.

Also, the width of the coolant inlet port greatly affects the temperature deviation among the unit cells except in the case in which the top of the coolant introduction part is configured to have the specific inclined structure as previously described.

When the coolant inlet port has a width equivalent to 5 to 25% the length of the battery pack case corresponding to the length of the unit cell stack, therefore, it is possible to more efficiently reduce temperature deviation of the coolant caused depending upon device installation conditions. Preferably, the coolant inlet port has a width equivalent to 10 to 20% the length of the battery pack case corresponding to the length of the unit cell stack.

The end of the battery pack case opposite to the coolant inlet port may be spaced apart from the top of the unit cell stack by a height equivalent to 10% or less the height of the unit cell stack. This structure appropriately restricts a coolant flux reaching the end of the battery pack case opposite to the coolant inlet port, thereby further improving uniform distribution of the coolant to the unit cells.

In this case, the end of the battery pack case opposite to the coolant inlet port may be spaced apart from the top of the unit cell stack by a height of 1 to 10 mm.

Meanwhile, the battery pack according to the present invention is preferably applied to a structure having critical cooling efficiency, i.e. a structure in which the length of the battery pack case in the stacked direction of the unit cells is greater than that of the battery pack case in the lateral direction of each of the unit cells.

The coolant discharge part may have a uniform height with respect to the bottom of the unit cell stack. That is, the bottom of the coolant discharge part facing the bottom of the unit cell stack may have the same height as the bottom of the unit cell stack. Alternatively, the structure of the coolant discharge part may be partially changed to improve coolant discharge efficiency.

The coolant inlet port or the coolant outlet port may have a fan mounted therein to move a coolant, introduced through the coolant inlet port, to the coolant outlet port after the coolant passes through the battery module.

Specifically, the fan may be a blow fan mounted in the coolant inlet port to blow a coolant to the battery module or a suction fan mounted in the coolant outlet port to suction a coolant from the battery module. The blow fan and the suction fan may be simultaneously used.

Each of the unit modules may be configured to have a structure comprising two or more battery cells, electrode terminals of which are connected in series to each other, and a pair of module housings coupled to surround outsides of the battery cells excluding the electrode terminals of the battery cells.

The module housings restrain the repetitive expansion and contraction change of the battery cells during the charge and discharge of the battery cells, while protecting the battery cells having low mechanical strength, thereby preventing separation between sealed regions of the battery cells.

The structure of the module housings is not particularly restricted so long as the battery cells are mounted in the module housings. In an unlimited example, the module housings may have an internal structure corresponding to the external shape of the battery cell stack. In particular, the module housings may be coupled to each other in an assembly type fastening fashion without using additional fastening members.

In a preferred example, each of the unit modules may be configured to have a structure in which two battery cells are mounted in a sheathing member made of a metallic material.

The battery cells are secondary batteries having a small thickness and a relatively large width and length such that the total size of the secondary batteries is minimized when the secondary batteries are stacked to construct a battery module. In a preferred example, each battery cell may be a secondary battery configured to have a structure in which an electrode assembly is mounted in a battery case made of a laminate sheet including a resin layer and a metal layer, and electrode terminals protrude from upper and lower ends of the battery case. Specifically, each battery cell may be configured to have a structure in which an electrode assembly is mounted in a pouch-shaped battery case made of an aluminum laminate sheet. The secondary battery with the above-stated construction may be referred to as a pouch-shaped battery cell.

A cell case of the pouch-shaped battery cell may be configured to have various structures. For example, the case of the pouch-shaped battery cell may be configured to have a structure in which an electrode assembly is received in a receiving part formed at an upper inner surface and/or a lower inner surface of a two-unit member, and the upper and lower contact regions are sealed. A pouch-shaped battery cell with the above-described construction is disclosed in PCT International Application No. PCT/KR2004/003312, which has been filed in the name of the applicant of the present patent application. The disclosure of the above-mentioned patent application is hereby incorporated by reference as if fully set forth herein.

The electrode assembly includes cathodes and anodes, by which the charge and the discharge of the battery are possible. The electrode assembly may be configured to have a structure in which cathodes and anodes are stacked while separators are disposed respectively between the cathodes and the anodes. For example, the electrode assembly may be configured to have a jelly-roll type structure, a stacked type structure, or a stacked/folded type structure. The cathodes and the anodes of the electrode assembly may be configured such that electrode tabs of the cathodes and electrode tabs of the anodes directly protrude outward from the battery. Alternatively, the cathodes and the anodes of the electrode assembly may be configured such that the electrode tabs of the cathodes and the electrode tabs of the anodes are connected to additional leads, and the leads protrude outward from the battery.

The battery cells may be connected in series and/or parallel to each other in one unit module, or the battery cells of one unit module may be connected in series and/or parallel to the battery cells of another unit module. In a preferred example, a plurality of unit modules may be manufactured by coupling electrode terminals of the battery cells to each other in a state in which the battery cells are arranged in series in the longitudinal direction such that the electrode terminals of the battery cells are successively adjacent to each other, bending two or more battery cells such that the battery cells are stacked, and covering a predetermined number of stacked battery cells using module housings.

The coupling between the electrode terminals may be achieved in various manners, such as welding, soldering, and mechanical coupling. Preferably, the coupling between the electrode terminals is achieved by welding.

Of the outer edge sealed portion of the battery cell, the side sealed portion may be bent so as to approximately coincide with the inner shape of the module housings. As a result, space utilization is improved, and therefore, it is possible to manufacture a compact battery module.

In a case in which the electrode terminals protrude outward from the upper and lower ends of the battery cell as described above, if an odd number of battery cells are connected in series to each other, the electrode terminals are located at the opposite ends of the battery cells in each unit module with the result that the subsequent process is not easily performed. For this reason, it is preferable to connect an even number of battery cells in series to each other.

Also, the module housings may be provided at the outer edges thereof with protrusions to provide flow channels when the module housings are stacked. When the unit modules are stacked, the protrusions come into contact with each other to form flow channels, through which a coolant flows, between the protrusions.

In another preferred example, portions of the module housings corresponding to the portions of the battery cells from which the electrodes protrude outward may be lower than the remaining portions of the module housings to fix the portions of the battery cells from which the electrodes protrude outward.

The battery cells are not particularly restricted so long as the battery cells are secondary batteries which can be charged and discharged. Preferably, the battery cells are lithium secondary batteries, each of which has a large power or capacity to weight ratio.

In accordance with another aspect of the present invention, there is provided a vehicle using the battery pack with the above-stated construction as a power source, having a limited installation space, and exposed to frequent vibration and strong impact.

In a preferred example, the vehicle may be an electric vehicle, a hybrid electric vehicle, or a plug-in hybrid electric vehicle requiring high power and large capacity.

Of course, the battery pack used as the power source of the vehicle may be combined and manufactured based on desired power and capacity.

In this case, the vehicle may be an electric vehicle, a hybrid electric vehicle, or a plug-in hybrid electric vehicle wherein the battery pack is installed in the lower end of a trunk of the vehicle or between a rear seat and the trunk of the vehicle.

The electric vehicle, the hybrid electric vehicle, or the plug-in hybrid electric vehicle using the battery pack as the power source thereof are well known in the art to which the present invention pertains, and therefore, a detailed description thereof will be omitted.

DESCRIPTION OF DRAWINGS

The above and other objects, features and other advantages of the present invention will be more clearly understood from the following detailed description taken in conjunction with the accompanying drawings, in which.

BEST MODE

Now, preferred embodiments of the present invention will be described in detail with reference to the accompanying drawings. It should be noted, however, that the scope of the present invention is not limited by the illustrated embodiments.

Figure 1:
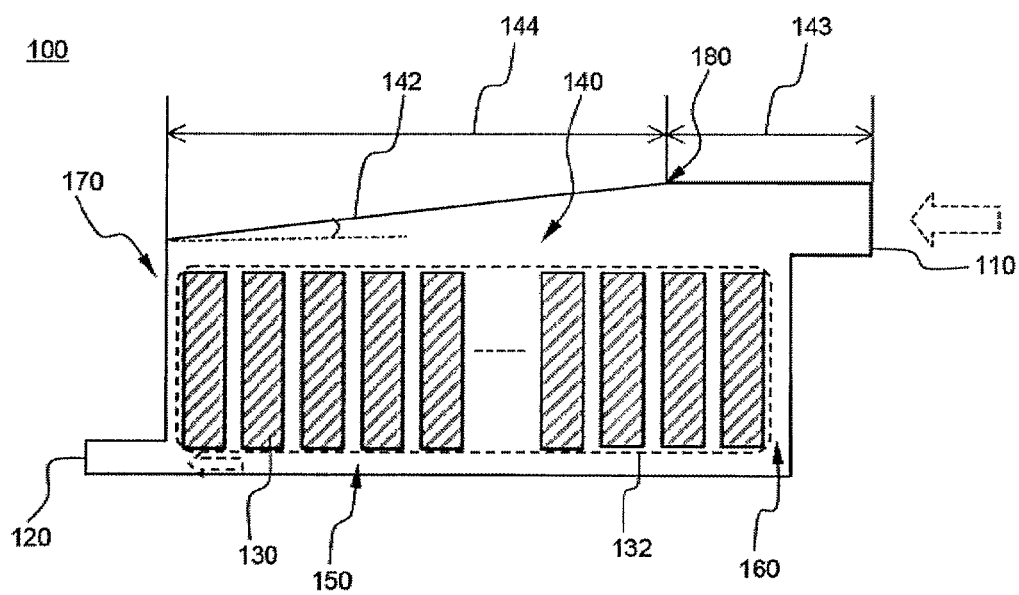
FIG. 1 is a vertical sectional view showing a conventional battery pack.

FIG. 1 is a vertical sectional view typically showing a conventional battery pack configured to have a structure in which the upper end of a coolant introduction part is inclined.

Referring to FIG. 1, a battery pack 100 includes a battery module 132 configured to have a structure in which a plurality of unit modules 130 is stacked such that the unit modules 130 are electrically connected to each other, a pack case 170 in which the battery module 132 is mounted, a coolant introduction part 140, which is a flow space extending from a coolant inlet port 110 to the battery module 132, and a coolant discharge part 150, which is a flow space extending from the battery module 132 to a coolant outlet port 120.

A coolant, introduced through the coolant inlet port 110, flows through the coolant introduction part 140 and flow channels 160 defined between the respective unit modules 130. At this time, the coolant cools the unit modules 130. After that, the coolant flows through the coolant discharge part 150 and is then discharged out of the battery pack through the coolant outlet port 120.

The coolant introduction part 140 includes a parallel introduction part 143 formed in parallel to the direction in which the unit modules 130 are stacked such that a coolant introduction duct (not shown) is connected to a part of the coolant introduction part 140 adjacent to the coolant inlet port 110 and an inclined introduction part 144 in which a top 142 of coolant introduction part 140 is inclined at a predetermined angle toward the end opposite to the coolant inlet port 110. A point at which the parallel introduction part 143 and the inclined introduction part 144 are connected to each other is referred to as an inclined inflection point 180.

In the conventional battery pack, the inclined inflection point 180 is spaced apart from a first coolant flow channel between the pack case 170 at the coolant inlet port 110 side and the unit module 130 at the coolant inlet port 110 side by a predetermined distance toward the end of the pack case 170 opposite to the coolant inlet port 110 for easy connection of the coolant introduction duct (not shown).

Figure 2:
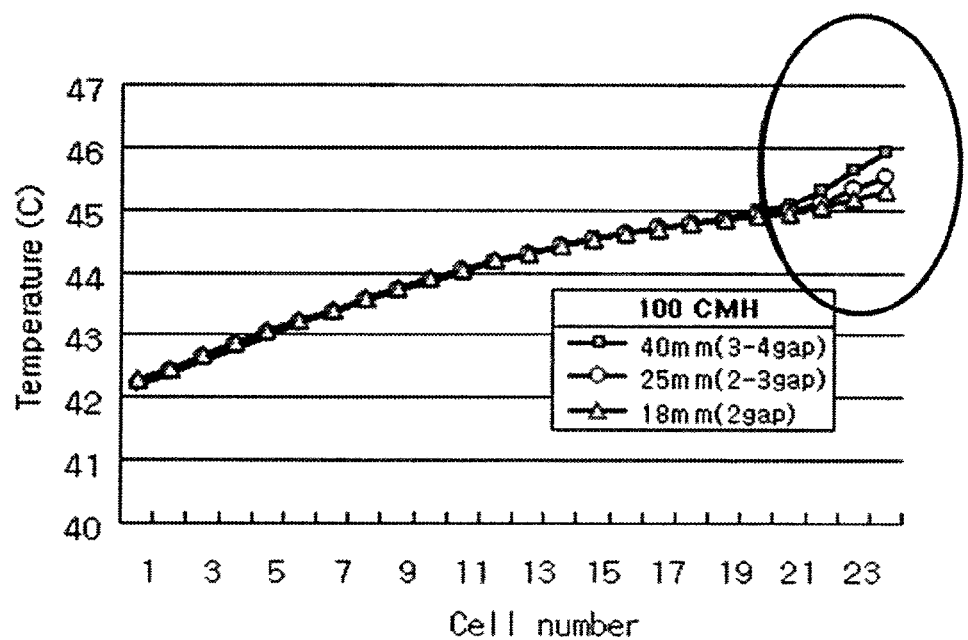
FIG. 2 is a graph showing the measurement results of temperature deviation among unit modules in the battery pack of FIG. 1.

FIG. 2 is a graph showing the measurement results of temperature deviation among the respective unit modules in the battery pack of FIG. 1.

Referring to FIG. 2 together with FIG. 1, there are shown the measurement results of temperatures of the unit modules 130 stacked in the pack case 170 of FIG. 1 from the unit module adjacent to the coolant outlet port 120 to the unit module adjacent to the coolant inlet port 110. That is, unit module number 1 indicates the unit module adjacent to the coolant outlet port 120, and unit module number 24 indicates the unit module adjacent to the coolant inlet port 110.

The temperature measurement experiments were carried out at an air flow of 100 cubic meter per hour (CMH, $cm^3/h$) under conditions in which a predetermined load was applied to the battery cells and external temperature was maintained at room temperature. Also, the temperature measurement experiments were carried out under conditions in which the inclined introduction part 144 had an inclination angle of 5 degrees, and the inclined inflection point 180 was located between third and fourth cooling flow channels (40 mm), between second and third cooling flow channels (25 mm), and on the second cooling flow channel (18 mm) from the coolant inlet port.

As can be seen from FIG. 2, the measurement results revealed that unit module numbers 22 to 24 had high temperatures, which deviate from a temperature distribution graph of the total unit modules. These results were equally obtained under conditions in which the inclined inflection point 180 was located at 40 mm, 25 mm, and 18 mm from the coolant inlet port although the results were slightly different from each other. As a result, temperature deviation among the unit modules is increased.

In the above structure, a relatively low coolant flux is introduced into the flow channels defined between the unit modules adjacent to the coolant inlet port 110 with the result that the unit modules are not effectively cooled, and therefore, the temperature deviation between the unit modules adjacent to the coolant outlet port 120 and the unit modules adjacent to the coolant inlet port 110 is high. In the parallel introduction part, a coolant flows in the horizontal direction with the result that coolant flux in the flow channels adjacent to the coolant inlet port 110 is reduced. Therefore, this phenomenon shows that it is not possible to effectively reduce temperature deviation among the unit modules 130 merely by inclining the top 142 of the coolant introduction part 140.

Figure 3:
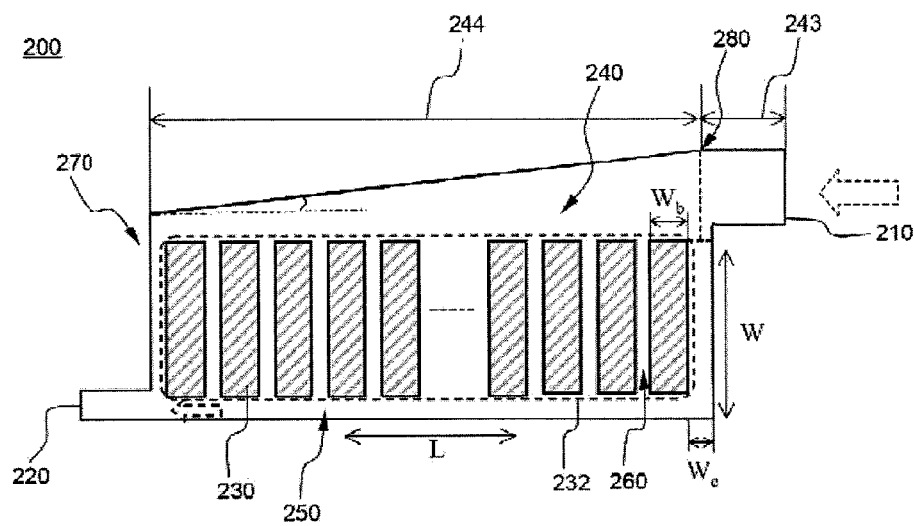
FIG. 3 is a vertical sectional view showing a battery pack according to an embodiment of the present invention.

FIG. 3 is a vertical sectional view typically showing a battery pack according to an embodiment of the present invention.

Referring to FIG. 3, a pack case 270 is configured such that the length of the pack case 270 in a stacked direction L of unit modules 230 is greater than that of the pack case 270 in a lateral direction W of each of the unit modules 230. Also, a coolant inlet port 210 and a coolant outlet port 220 are disposed at the upper part and the lower part of the pack case 270, respectively, in opposite directions such that a coolant flows from one side of a battery module 232 to the other side of the battery module 232 in a direction perpendicular to the stacked direction L of the unit modules 230.

Between the respective unit modules 230 are defined small flow channels 260, through which a coolant flows. Consequently, a coolant, introduced through the coolant inlet port 210, flows through flow channels 260. At this time, the coolant removes heat generated from the unit modules 230. After that, the coolant is discharged out of the battery pack through the coolant outlet port 220.

The battery pack 200 is substantially identical to the battery pack 100 of FIG. 1 in terms of a coolant discharge part 250 and the flow channels 260 except that an inclined inflection point 280 is disposed on a first coolant flow channel.

In this structure, cooling efficiency of battery cells adjacent to the coolant inlet port 210 is higher than that in the battery pack 100 of FIG. 1. Since the inclined inflection point 280 is disposed on a region to which a perpendicular extension line of the middle of the width of the first coolant flow channel is connected, a coolant flux introduced into the first coolant flow channel is greater than that in the battery pack 100 of FIG. 1. Consequently, cooling efficiency of the unit modules adjacent to the coolant inlet port 210 is higher than that in the battery pack 100 of FIG. 1.

Figure 4:
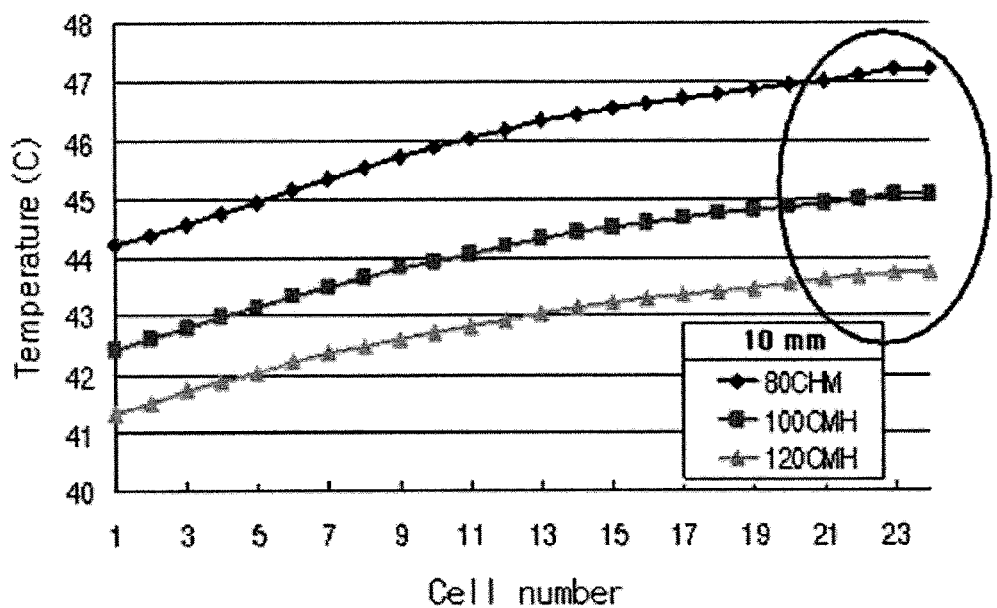
FIG. 4 is a graph showing measurement results of temperature deviation among unit modules in the battery pack of FIG. 3.

FIG. 4 is a graph showing the measurement results of temperature deviation among the respective unit modules in the battery pack of FIG. 3.

Referring to FIG. 4 together with FIG. 3, there are shown the measurement results of temperatures of the unit modules 230 stacked in the pack case 270 of FIG. 3 from the unit module adjacent to the coolant outlet port 220 to the unit module adjacent to the coolant inlet port 210 in the same manner as in the experiment of FIG. 2. That is, unit module number 1 indicates the unit module adjacent to the coolant outlet port 220, and unit module number 24 indicates the unit module adjacent to the coolant inlet port 210.

The temperature measurement experiments were carried out at an air flow of 80 CMH, 100 CMH, and 120 CMH under conditions in which a predetermined load was applied to the battery cells and external temperature was maintained at room temperature. Also, the temperature measurement experiments were carried out under conditions in which an inclined introduction part 244 had an inclination angle of 5 degrees, and the inclined inflection point 280 was spaced apart from the first coolant flow channel toward the coolant outlet port by the width of each unit cell (10 mm).

As can be seen from FIG. 4, the measurement results revealed that unit module numbers 22 to 24 followed a temperature distribution graph of the total unit modules. These results were equally obtained under the conditions of 80 CMH, 100 CMH, and 120 CMH. Comparison between these results and FIG. 2 shows that temperature deviation among the unit modules (temperature difference between unit module numbers 1 and 24) is less than that among the unit modules of the battery pack of FIG. 2.

Specifically, as can be seen from the graph of FIG. 2, in which the temperature measurement experiments were carried out under a condition of 100 CMH, the temperature deviation among the total unit modules exceeded 3° C. In FIG. 4, in which the temperature measurement experiments were carried out under the same conditions, i.e. 100 CMH, the temperature deviation among the total unit modules is about 2.6° C. That is, the temperature deviation in the battery pack is reduced.

In the above structure, a relatively high coolant flux is introduced into the flow channels defined between the unit modules adjacent to the coolant inlet port 110 with the result that the unit modules are effectively cooled, and therefore, the temperature deviation between the unit modules adjacent to the coolant outlet port 120 and the unit modules adjacent to the coolant inlet port 110 is low.

Also, in a case in which the inclined inflection point is located on the first coolant flow channel or even in a case in which the inclined inflection point is spaced apart from the first coolant flow channel toward the coolant outlet port by the width of each unit cell, the same results as in FIG. 4 are obtained.

INDUSTRIAL APPLICABILITY

As is apparent from the above description, the battery pack according to the present invention is configured to have a structure in which the cooling deviation between the battery cells is reduced, thereby improving cooling uniformity among the unit modules and thus improving the performance of the battery pack.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A battery pack in which a plurality of battery cells is mounted in a battery pack case such that the battery cells are stacked, comprising:

the battery pack case having a coolant inlet port at an upper part and a coolant outlet port at a lower part, which are directed in opposite directions such that a coolant to cool the battery cells flows from one side to the other side of the battery pack case, the upper part being spaced from the lower part in a first direction, and a first side wall closest to the coolant inlet port and a second side wall opposite the first side wall, wherein the battery pack case is further provided with a coolant introduction part extending from the coolant inlet port, wherein the coolant introduction part comprises:
a parallel introduction part adjacent to the coolant inlet port, the parallel introduction part extending in the first direction; and
an inclined introduction part connected to the parallel introduction part, the inclined introduction part extending from the coolant inlet port to an end of the battery pack case opposite to the coolant inlet port such that a distance between the inclined introduction part and the top of the battery cells is gradually decreased, and
an inclined inflection point at which the parallel introduction part and the inclined introduction part are connected to each other is aligned with a first coolant flow channel between a first battery cell closest to the coolant inlet port and the first side wall of the battery pack case,
wherein the inclined inflection point is located on a region of an extension line extending perpendicular to a width of the first coolant flow channel.

2. The battery pack according to claim 1, wherein the inclined inflection point is located within a deviation range corresponding to a width ($W_b$) of the first battery cell on the basis of a central axis of the first coolant flow channel.

3. The battery pack according to claim 1, wherein the first coolant flow channel has a width ($W_c$) equivalent to 10 to 100% a width ($W_b$) of the first battery cell.

4. The battery pack according to claim 1, wherein the inclined introduction part has an inclination angle of 3 to 8 degrees.

5. The battery pack according to claim 1, wherein the coolant inlet port has a width equivalent to 5 to 25% a length of the battery cells.

6. The battery pack according to claim 1, wherein the end of the battery pack case opposite to the coolant inlet port is spaced apart from the top of the battery cells by from a height of 1 mm to a height equivalent to 10% or less a height of the battery cells.

7. The battery pack according to claim 6, wherein the end of the battery pack case opposite to the coolant inlet port is spaced apart from the top of the battery cells by a height of 1 to 10 mm.

8. The battery pack according to claim 1, wherein the battery pack case is configured such that a length of the battery pack case in the first direction of the battery cells is greater than that of the battery pack case in a second direction perpendicular to the first direction.

9. The battery pack according to claim 1, further comprising a coolant discharge part extending from the battery pack case to the coolant outlet port having a uniform height with respect to a bottom of the battery cells.

10. The battery pack according to claim 1, wherein the coolant inlet port or the coolant outlet port has a fan mounted therein to move a coolant, introduced through the coolant inlet port, to the coolant outlet port after the coolant passes through the battery pack case.

11. The battery pack according to claim 1, further comprising unit modules, the unit modules comprising two or more battery cells, electrode terminals of which are connected in series to each other, and a pair of sheathing members coupled to surround outsides of the battery cells excluding the electrode terminals of the battery cells.

12. The battery pack according to claim 11, wherein each of the unit modules is configured to have two battery cells mounted in a sheathing member made of a metallic material.

13. A vehicle comprising a battery pack according to claim 1 as a power source.

14. The vehicle according to claim 13, wherein the vehicle is an electric vehicle, a hybrid electric vehicle, or a plug-in hybrid electric vehicle.

15. The battery pack according to claim 1, wherein the inclined introduction part has an inclination angle of 5 degrees.

16. The battery pack according to claim 1, further comprising a last coolant flow channel between a last battery cell closest to the coolant outlet port and the second side wall of the battery pack case.

* * * * *